United States Patent
Chen

(10) Patent No.: US 12,321,519 B2
(45) Date of Patent: Jun. 3, 2025

(54) TOUCH PANEL AND TOUCH DEVICE

(71) Applicants: Beijing BOE Technology Development Co., Ltd., Beijing (CN); BOE Technology Group Co., Ltd., Beijing (CN)

(72) Inventor: Yuju Chen, Beijing (CN)

(73) Assignees: Beijing BOE Technology Development Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/005,298

(22) PCT Filed: Jan. 29, 2022

(86) PCT No.: PCT/CN2022/074980
§ 371 (c)(1),
(2) Date: Jan. 12, 2023

(87) PCT Pub. No.: WO2023/142037
PCT Pub. Date: Aug. 3, 2023

(65) Prior Publication Data
US 2024/0241582 A1    Jul. 18, 2024

(51) Int. Cl.
*G06F 3/01* (2006.01)
*G06F 3/044* (2006.01)

(52) U.S. Cl.
CPC ............ *G06F 3/016* (2013.01); *G06F 3/0445* (2019.05)

(58) Field of Classification Search
CPC .............................. G06F 3/016; G06F 3/0445
See application file for complete search history.

(56) References Cited

U.S. PATENT DOCUMENTS

| | | | |
|---|---|---|---|
| 2017/0010707 A1 | 1/2017 | Son | |
| 2017/0052640 A1 | 2/2017 | Day | |
| 2017/0192560 A1* | 7/2017 | Ham | ........................ G06F 3/016 |

FOREIGN PATENT DOCUMENTS

| | | | | |
|---|---|---|---|---|
| CN | 101825967 | * | 9/2010 | ............. G06F 3/016 |
| CN | 102096515 A | | 6/2011 | |
| CN | 102446040 A | | 5/2012 | |
| CN | 106527781 A | | 3/2017 | |
| CN | 106527822 A | | 3/2017 | |
| CN | 106774948 A | | 5/2017 | |
| CN | 106775055 A | | 5/2017 | |
| CN | 107015694 A | | 8/2017 | |
| JP | WO 2014007088 | * | 1/2014 | ......... H10N 30/2042 |
| JP | 2019212259 A | | 12/2019 | |
| JP | 6739692 | * | 8/2020 | ............. G06F 3/016 |
| WO | 2014007088 A1 | | 1/2014 | |

* cited by examiner

Primary Examiner — Nelson M Rosario
Assistant Examiner — Scott D Au
(74) Attorney, Agent, or Firm — Workman Nydegger

(57) ABSTRACT

Embodiments of the disclosure provide a touch panel and a touch device. The touch panel includes: a touch structure; a tactile sensor stacked with the touch structure and configured to generate a standing wave on a surface of the touch panel during operation to realize tactile reproduction; and a first electrode layer located between the touch structure and the tactile sensor, where the first electrode layer is insulated from the tactile sensor and the touch structure, and the first electrode layer is grounded.

20 Claims, 18 Drawing Sheets

TOUCH PANEL AND TOUCH DEVICE

This application is a National Stage of International Application No. PCT/CN2022/074980, filed on Jan. 29, 2022, which is hereby incorporated by reference in its entirety.

FIELD

The disclosure relates to the field of sensor technology, and particularly to a touch panel and a touch device.

BACKGROUND

The Haptics is the focus of today's technology development, and the Haptics can enable a terminal to interact with the human body through the sense of touch. The Haptics may be divided into two categories: one is vibration feedback, and the other is tactile reproduction technology.

The surface tactile reproduction technology can perceive characteristics of objects through touch of a screen by a bare finger, realize efficient and natural interaction on multimedia terminals, has great research value, and thus has been widely concerned by domestic and foreign researchers. In the physical sense, the surface tactile sense is the effect of the surface roughness of the object on the surface of the skin (fingertip), and different friction forces are formed due to different surface structures. Therefore, different haptic/tactile simulations can be realized by controlling the surface friction forces.

SUMMARY

Embodiments of the disclosure provide a touch panel and a touch device, and the specific solutions are as follows.

A touch panel according to an embodiment of the disclosure includes: a touch structure; a tactile sensor stacked with the touch structure and configured to generate a standing wave on a surface of the touch panel during operation to realize tactile reproduction; a first electrode layer located between the touch structure and the tactile sensor, where the first electrode layer is insulated from the tactile sensor and the touch structure, and the first electrode layer is grounded.

In a possible implementation, the above-mentioned touch panel according to an embodiment of the disclosure further includes a base substrate located between the touch structure and the tactile sensor.

In a possible implementation, in the above-mentioned touch panel according to an embodiment of the disclosure, the base substrate is located between the tactile sensor and the first electrode layer.

In a possible implementation, the above-mentioned touch panel according to an embodiment of the disclosure further includes a first connection layer located between the first electrode layer and the touch structure.

In a possible implementation, in the above-mentioned touch panel according to an embodiment of the disclosure, the base substrate is located between the first electrode layer and the touch structure.

In a possible implementation, the above-mentioned touch panel according to an embodiment of the disclosure further includes a first insulating layer located between the tactile sensor and the first electrode layer.

In a possible implementation, the above-mentioned touch panel according to an embodiment of the disclosure further includes a first connection layer located between the base substrate and the touch structure.

In a possible implementation, the above-mentioned touch panel according to an embodiment of the disclosure further includes a base substrate, where the touch structure, the tactile sensor and the first electrode layer are located on a same side of the base substrate.

In a possible implementation, the above-mentioned touch panel according to an embodiment of the disclosure further includes a first insulating layer located between the first electrode layer and the tactile sensor.

In a possible implementation, the above-mentioned touch panel according to an embodiment of the disclosure further includes a first connection layer located between the first electrode layer and the touch structure.

In a possible implementation, the above-mentioned touch panel according to an embodiment of the disclosure further includes a second electrode layer located on a side of the base substrate away from the first electrode layer, where the second electrode layer is grounded.

In a possible implementation, in the above-mentioned touch panel according to an embodiment of the disclosure, the tactile sensor includes a third electrode layer, a piezoelectric layer and a fourth electrode layer stacked, the third electrode layer is close to the base substrate, and the piezoelectric layer includes a plurality of independently arranged piezoelectric parts; where the first electrode layer is designed as a whole surface.

In a possible implementation, in the above-mentioned touch panel according to an embodiment of the disclosure, the tactile sensor includes a third electrode layer, a piezoelectric layer and a fourth electrode layer stacked, the third electrode layer is close to the base substrate, and the piezoelectric layer includes a plurality of independently arranged piezoelectric parts; where the first electrode layer includes a plurality of first electrodes arranged in one-to-one correspondence with the piezoelectric parts, and all of the first electrodes are electrically connected.

In a possible implementation, in the above-mentioned touch panel according to an embodiment of the disclosure, a material of the first electrode layer includes a transparent conductive material or a metal material.

In a possible implementation, in the above-mentioned touch panel according to an embodiment of the disclosure, the transparent conductive material includes at least one of indium tin oxide, indium zinc oxide or indium gallium zinc oxide.

In a possible implementation, in the above-mentioned touch panel according to an embodiment of the disclosure, the metal material includes at least one of platinum, copper or gold.

In a possible implementation, in the above-mentioned touch panel according to an embodiment of the disclosure, when the material of the first electrode layer includes the transparent conductive material, a film thickness of the transparent conductive material is in a range of 200 nm to 500 nm; when the material of the first electrode layer includes the metal material, a film thickness of the metal material is in a range of 100 nm to 300 nm.

In a possible implementation, in the above-mentioned touch panel according to an embodiment of the disclosure, a thickness of the piezoelectric layer is in a range of 2 μm to 5 μm.

In a possible implementation, in the above-mentioned touch panel according to an embodiment of the disclosure, a material of the first connection layer includes optical clear adhesive or optical clear resin.

In a possible implementation, in the above-mentioned touch panel according to an embodiment of the disclosure, a maximum thickness of the first connection layer is in a range of 30 μm to 50 μm.

In a possible implementation, in the above-mentioned touch panel according to an embodiment of the disclosure, the tactile sensor further includes: an inorganic insulating layer located on a side of the fourth electrode layer away from the piezoelectric layer, and a wiring layer located on a side of the inorganic insulating layer away from the piezoelectric layer; where the inorganic insulating layer has a first via hole arranged corresponding to the fourth electrode layer, and the wiring layer is electrically connected to the fourth electrode layer through the first via hole.

In a possible implementation, in the above-mentioned touch panel according to an embodiment of the disclosure, the tactile sensor further includes: an organic insulating layer located on a side of the fourth electrode layer away from the piezoelectric layer, an inorganic insulating layer located on a side of the organic insulating layer away from the piezoelectric layer, and a wiring layer located on a side of the inorganic insulating layer away from the piezoelectric layer; where the organic insulating layer has a first via hole arranged corresponding to the fourth electrode layer, the inorganic insulating layer does not overlap at least partially with the first via hole, and one end of the wiring layer is electrically connected to the fourth electrode layer through at least a part of the first via hole.

In a possible implementation, in the above-mentioned touch panel according to an embodiment of the disclosure, the inorganic insulating layer covers a sidewall of the first via hole and extends to contact with the fourth electrode layer.

In a possible implementation, in the above-mentioned touch panel according to an embodiment of the disclosure, at the first via hole, a contact boundary between the inorganic insulating layer and the fourth electrode layer is a first boundary, a contact boundary between the organic insulating layer and the fourth electrode layer is a second boundary, and a distance between the first boundary and the second boundary is greater than 30% of a thickness of the piezoelectric layer and less than 60% of the thickness of the piezoelectric layer.

In a possible implementation, in the above-mentioned touch panel according to an embodiment of the disclosure, the inorganic insulating layer covers a sidewall of the first via hole and covers the fourth electrode layer exposed by the first via hole, a part of the fourth electrode layer covered by the inorganic insulating layer has at least one second via hole, and the wiring layer is electrically connected to the fourth electrode layer through the first via hole and the second via hole.

In a possible implementation, in the above-mentioned touch panel according to an embodiment of the disclosure, a number of the inorganic insulating layer is 1.

In a possible implementation, in the above-mentioned touch panel according to an embodiment of the disclosure, a material of the inorganic insulating layer includes at least one of $SiO_2$, $Al_2O_3$ or $Si_3N_4$.

In a possible implementation, in the above-mentioned touch panel according to an embodiment of the disclosure, the inorganic insulating layer includes at least two sub-insulating layers stacked, and materials of the two sub-insulating layers are different.

In a possible implementation, in the above-mentioned touch panel according to an embodiment of the disclosure, a material of each of the sub-insulating layers includes at least one of $SiO_2$, $Al_2O_3$ or $Si_3N_4$.

In a possible implementation, in the above-mentioned touch panel according to an embodiment of the disclosure, a shape of the wiring layer is a grid structure, and a material of the wiring layer is Ti/Ni/Au, Ti/Au or Ti/Al/Ti.

In a possible implementation, in the above-mentioned touch panel according to an embodiment of the disclosure, a thickness of the inorganic insulating layer is in a range of 100 nm to 300 nm.

In a possible implementation, in the above-mentioned touch panel according to an embodiment of the disclosure, a material of the piezoelectric layer includes at least one of lead zirconate titanate, aluminum nitride, zinc oxide, barium titanate, lead titanate, potassium niobate, lithium niobate, lithium tantalate, and gallium lanthanum silicate.

Correspondingly, an embodiment of the disclosure further provides a touch device, including the above-mentioned touch panel according to an embodiment of the disclosure.

In a possible implementation, in the above-mentioned touch device according to an embodiment of the disclosure, when materials of the third electrode layer, the fourth electrode layer and the first electrode layer include a transparent conductive material, the touch device further include a display device, the touch panel is located on a light emitting side of the display device, and a surface of the touch panel far away from the display device is a touch surface.

DETAILED DESCRIPTION OF EMBODIMENTS

Figure 1:
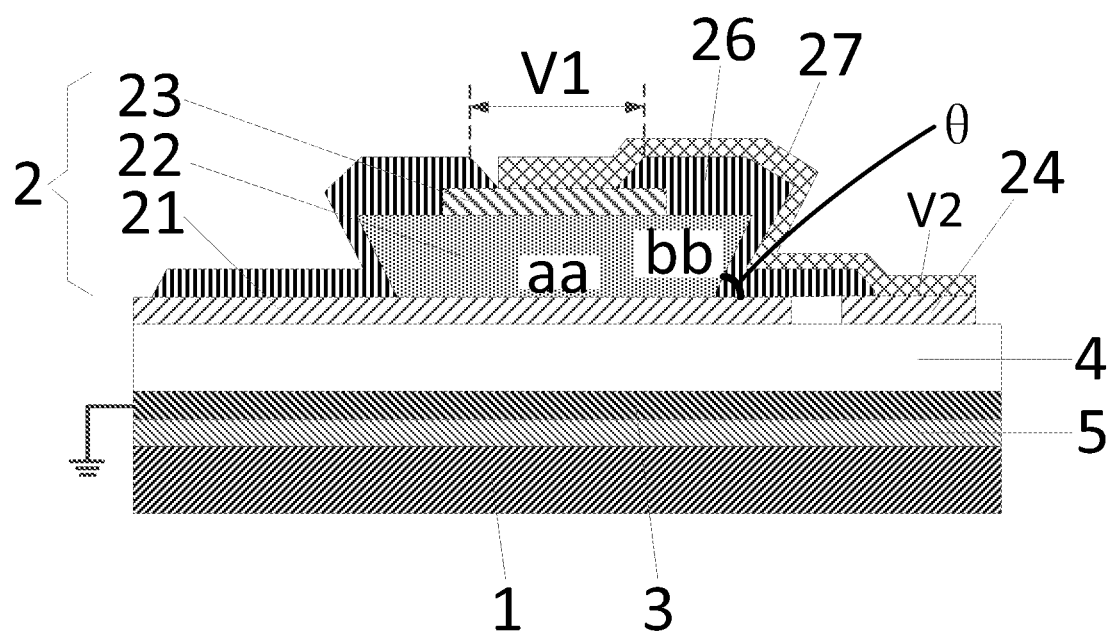
FIGS. 1-6, 8, 9, 12, 15 and 16 are schematic structural diagrams of several touch panels according to embodiments of the disclosure respectively.

In order to make the purposes, technical solutions and advantages of the disclosure clearer, the technical solutions of embodiments of the disclosure will be described clearly and completely below in combination with the accompanying drawings of embodiments of the disclosure. Obviously the described embodiments are a part of embodiments of the disclosure but not all embodiments. Also in the case of no conflict, embodiments and the features therein in the disclosure can be combined with each other. Based upon embodiments of the disclosure, all of other embodiments obtained by those ordinary skilled in the art without creative work pertain to the protection scope of the disclosure.

Unless otherwise defined, the technical or scientific terms used in the disclosure shall have the general meaning understood by those ordinary skilled in the art to which the disclosure belongs. The word such as "include" or "contain" or the like used in the disclosure means that the element or object appearing before this word encompasses the elements or objects and their equivalents listed after this word, without excluding other elements or objects. The word such as "connect" or "connected" or the like is not limited to the physical or mechanical connection, but can include the electrical connection, whether direct or indirect. The words such as "inner", "outer", "up", "down" are only used to represent the relative position relationship. When the absolute position of a described object changes, the relative position relationship may also change accordingly.

It should be noted that the size and shape of each diagram in the accompanying drawings do not reflect the true proportion, and are merely for purpose of schematically illustrating the content of the disclosure. Also, the same or similar reference numbers represent the same or similar elements or the elements having the same or similar functions all the way.

The operation principle of the traditional touch screen is to determine the touch coordinate position of the finger by detecting the change of capacitance, to realize the control of the touch screen. The thin-film piezoelectric material has characteristics of high dielectric constant and transparency, and is very suitable for the screen-integrated vibrator structure. The vibrator structure can be used to realize the tactile feedback function of the electronic device. When the touch screen is used as a sensor to detect finger coordinates and the vibrator structure is used as an actuator, the driving frequency ranges of the touch screen (driving frequency is 0.1 KHz to 5 KHz) and the vibrator structure (driving frequency is 0.1 KHz to 50 KHz) have a certain overlap, so the telecommunication coupling crosstalk may occur. If the touch is affected by the drive signal of the vibrator structure, the capacitive coupling is formed, which may cause incorrect operation and incorrect drive of the touch screen, thereby determining the incorrect position of the finger and making the whole product invalid. Therefore, the biggest problem at present is to isolate drive signals of the touch screen and the vibrator structure.

In view of this, an embodiment of the disclosure provides a touch panel, as shown in FIGS. 1-6, including: a touch structure 1; a tactile sensor 2 stacked with the touch structure 1 and configured to generate a standing wave on a surface of the touch panel during operation to realize tactile reproduction; a first electrode layer 3 located between the touch structure 1 and the tactile sensor 2, where the first electrode layer 3 is insulated from the tactile sensor 2 and the touch structure 1, and the first electrode layer 3 is grounded.

The above-mentioned touch panel according to an embodiment of the disclosure adopts a structure integrating the tactile sensor and the touch structure, and can realize the touch function and the tactile reproduction function. Also, the grounded first electrode layer is provided between the touch structure and the tactile sensor, and the first electrode layer acts as a shield to ensure that no coupling capacitance is formed between the touch structure and the tactile sensor, thereby ensuring that the touch structure will not be affected by the drive signal of the tactile sensor, and thus improving the touch effect of the touch structure.

Figure 2:
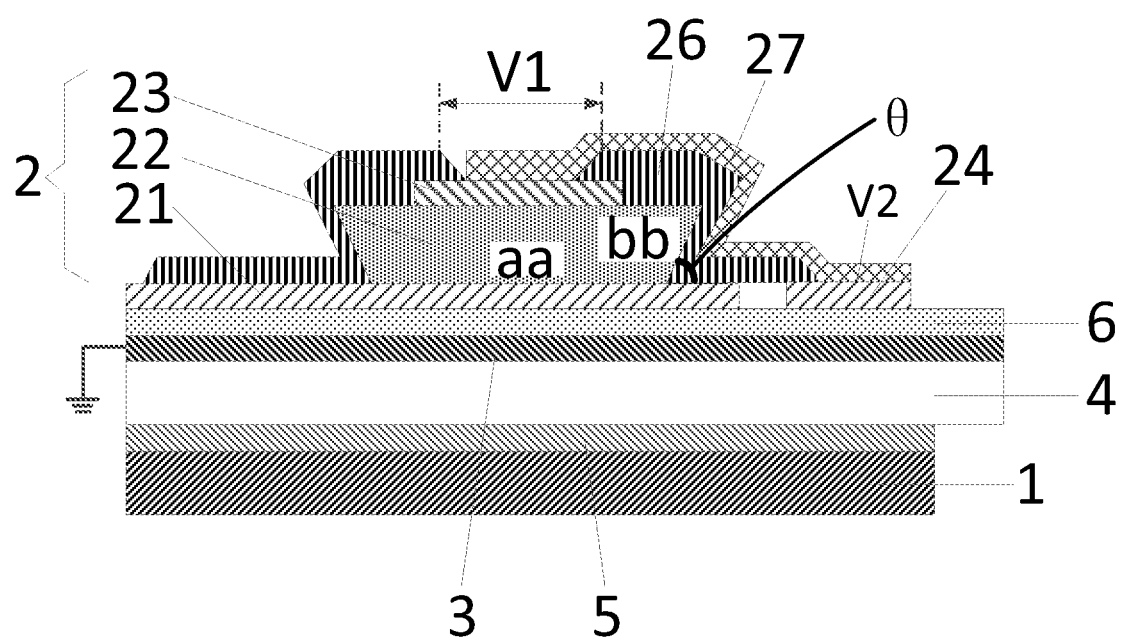
Figure 3:
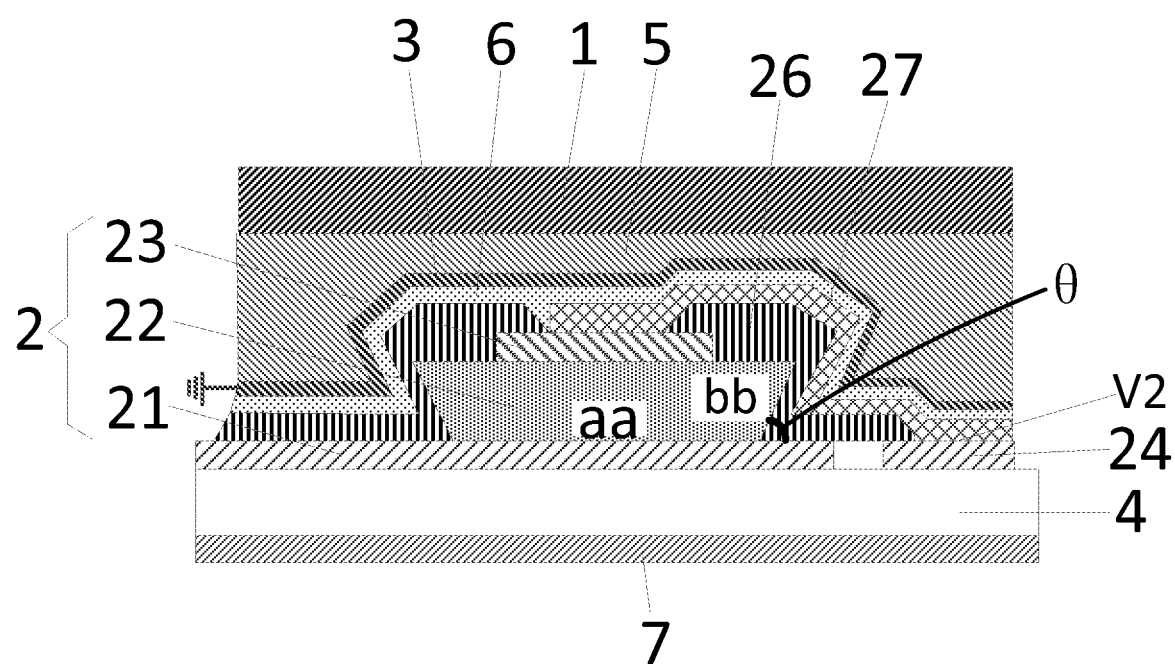
Figure 4:
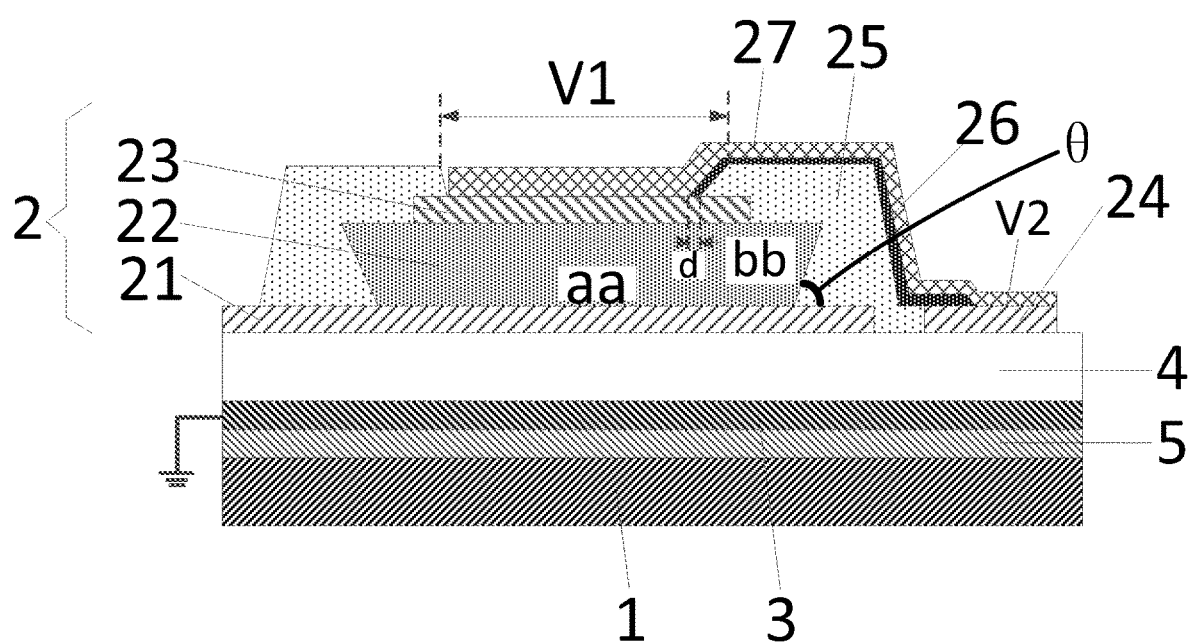
Figure 5:
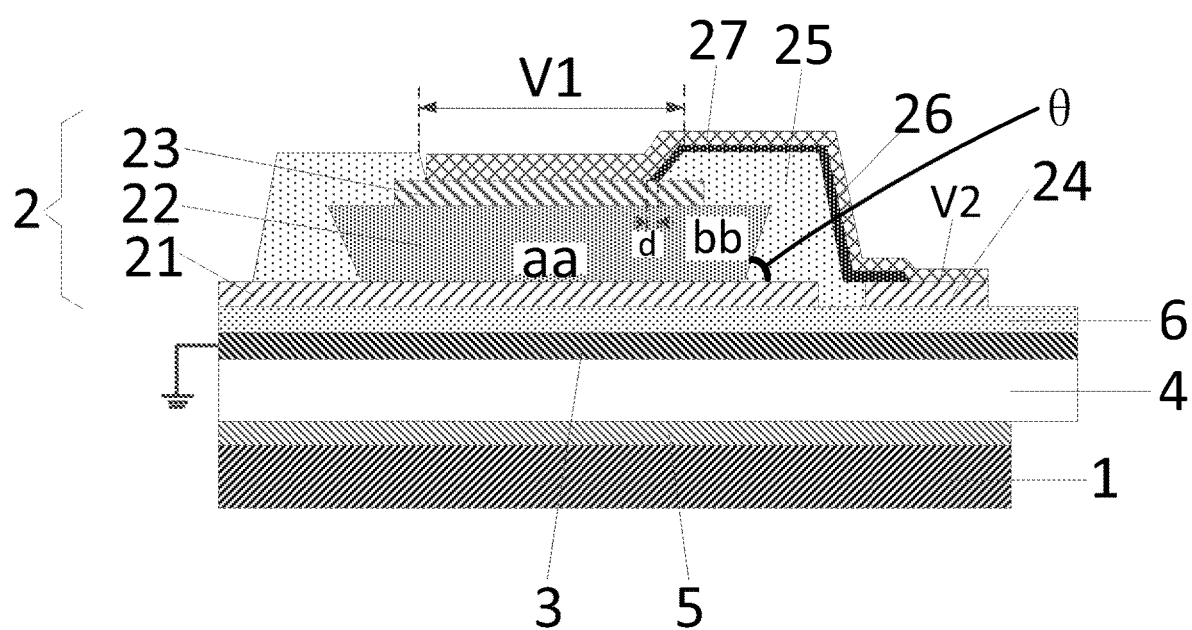
Figure 6:
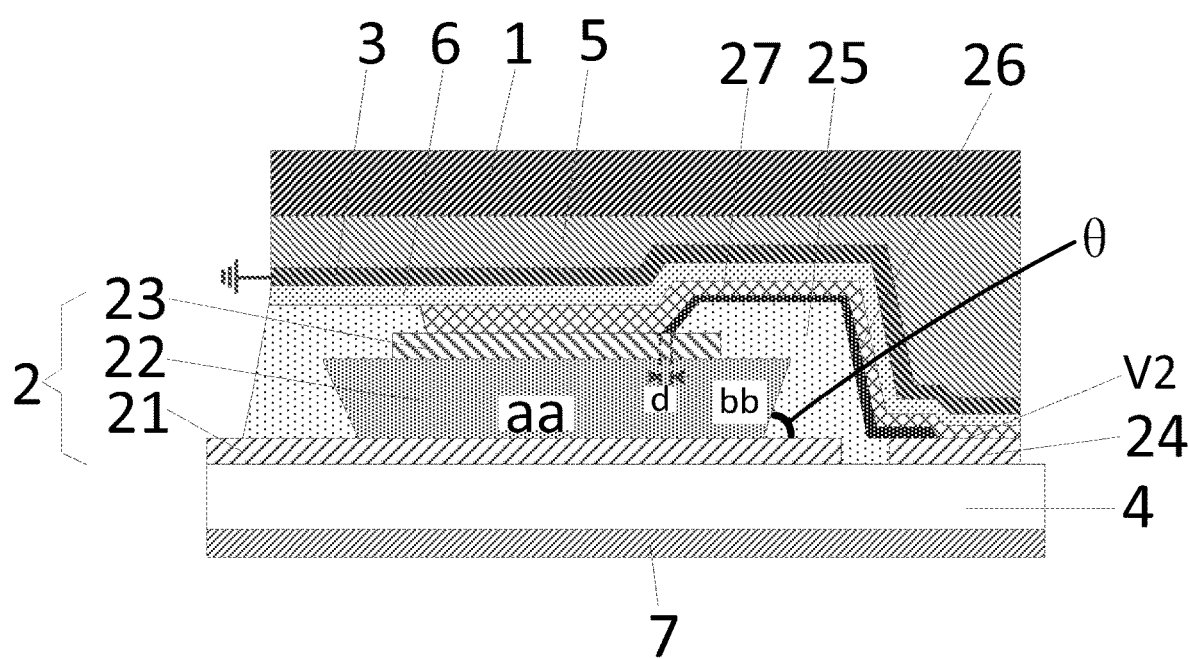

In a specific implementation, in the above-mentioned touch panel according to an embodiment of the disclosure, as shown in FIGS. 1-6, the tactile sensor 2 includes a third electrode layer 21, a piezoelectric layer 22 and a fourth electrode layer 23 stacked; and may further include: a bonding electrode 24 arranged in a same layer as the third electrode layer 21, where the bonding electrode 24 is arranged close to an edge of a base substrate (described later), the bonding electrode 24 is configured to connect to a drive voltage input terminal, and a voltage signal input from the drive voltage input terminal is an AC voltage signal. As shown in FIGS. 1-3, the tactile sensor further includes: an inorganic insulating layer 26 located on a side of the fourth electrode layer 23 away from the piezoelectric layer 22, and a wiring layer 27 located on a side of the inorganic insulating layer 26 away from the piezoelectric layer 22. The inorganic insulating layer 26 has a first via hole V1 arranged corresponding to the fourth electrode layer 23, one end of the wiring layer 27 is electrically connected to the fourth electrode layer 23 through the first via hole V1, and the other end of the wiring layer 27 is electrically connected to the bonding electrode 24 through a second via hole V2 penetrating the inorganic insulating layer 26. As shown in FIGS. 4-6, the tactile sensor 2 may further include: an organic insulating layer 25 located on a side of the fourth electrode layer 23 away from the piezoelectric layer 22, an inorganic insulating layer 26 located on a side of the organic insulating layer 25 away from the piezoelectric layer 22, and a wiring layer 27 located on ta side of the inorganic insulating layer 26 away from the piezoelectric layer 22. The organic insulating layer 25 has a first via hole V1 arranged corresponding to the fourth electrode layer 23, the inorganic insulating layer 26 does not overlap at least partially with the first via hole V1, one end of the wiring layer 27 is electrically connected to the fourth electrode layer 23 through at least a part of the first via hole V1, and the other end of the wiring layer 27 is electrically connected to the bonding electrode 24 through a second via hole V2 penetrating the inorganic insulating layer 26.

As shown in FIGS. 1-6, the third electrode layer 21 is grounded, and the bonding electrode 24 is connected to the drive voltage input terminal. The voltage signal input from the drive voltage input terminal is an AC voltage signal, and the AC voltage signal (VAC) is loaded to the fourth electrode layer 23 through the drive voltage input terminal, so that an alternating electric field can be formed between the third electrode layer 21 and the fourth electrode layer 23, and the frequency of the alternating electric field is the same as that of the AC voltage signal. Under the action of the alternating electric field, the piezoelectric layer 22 deforms and generates a vibration signal. The frequency of the vibration signal is the same as the frequency of the alternating electric field. When the frequency of the vibration signal is close to or equal to the natural frequency of the base substrate, the base substrate resonates, the amplitude is enhanced, and a tactile feedback signal is generated. When a finger touches the surface of the base substrate, the change of friction force can be clearly felt. In practical applications, the friction force on the surface of the base substrate can be adjusted through the resonance generated between the piezoelectric layer and the base substrate, to realize the texture reproduction of the object on the surface of the base substrate.

In this embodiment, the third electrode layer 21 and the bonding electrode 24 can be formed with the same material and using the same patterning process.

In a specific implementation, the above-mentioned touch panel according to an embodiment of the disclosure, as shown in FIG. 1, FIG. 2, FIG. 4 and FIG. 5, further includes a base substrate 4 located between the touch structure 1 and the tactile sensor 2.

In a specific implementation, in the above-mentioned touch panel according to an embodiment of the disclosure, as shown in FIG. 1 and FIG. 4, the base substrate 4 is located between the tactile sensor 2 and the first electrode layer 3.

In a specific implementation, the above-mentioned touch panel according to an embodiment of the disclosure, as shown in FIG. 1 and FIG. 4, further includes a first connection layer 5 located between the first electrode layer 3 and the touch structure 1.

As shown in FIG. 1 and FIG. 4, materials of the third electrode layer 21 and the fourth electrode layer 23 may include a transparent conductive material, and a material of the first electrode layer 3 also includes a transparent conductive material, so that the touch panel shown in FIG. 1 and FIG. 4 is a fully transparent device structure and can be used for integration with a display device. Certainly, the materials of the third electrode layer 21 and the fourth electrode layer 23 may also include a metal material, and the material of the first electrode layer 3 may include a transparent conductive material or a metal material. The materials of the third electrode layer 21, the fourth electrode layer 23 and the first electrode layer 3 are selected according to actual requirements.

In a specific implementation, in the above-mentioned touch panel according to an embodiment of the disclosure, as shown in FIG. 2 and FIG. 5, the base substrate 4 is located between the first electrode layer 3 and the touch structure 1.

In a specific implementation, the above-mentioned touch panel according to an embodiment of the disclosure, as shown in FIG. 2 and FIG. 5, further includes a first insulating layer 6 located between the tactile sensor 2 and the first electrode layer 3.

In a specific implementation, the above-mentioned touch panel according to an embodiment of the disclosure, as shown in FIG. 2 and FIG. 5, further includes a first connection layer 5 located between the base substrate 4 and the touch structure 1.

As shown in FIG. 2 and FIG. 5, the materials of the third electrode layer 21 and the fourth electrode layer 23 may include a metal material, and the material of the first electrode layer 3 also includes a metal material, so that the touch panel shown in FIG. 2 is an opaque device structure. Of course, the materials of the third electrode layer 21 and the fourth electrode layer 23 may also include a transparent conductive material, and the material of the first electrode layer 3 also includes a transparent conductive material, so that the touch panel shown in FIG. 2 and FIG. 5 is a fully transparent device structure and can be used for integration with the display device. Of course, the materials of the third electrode layer 21 and the fourth electrode layer 23 may also include a transparent conductive material, and the material of the first electrode layer 3 may also include a metal material, so that the touch panel shown in FIG. 2 and FIG. 5 is an opaque device structure. The materials of the third electrode layer 21, the fourth electrode layer 23 and the first electrode layer 3 are selected according to actual requirements.

In a specific implementation, the above-mentioned touch panel according to an embodiment of the disclosure, as shown in FIG. 3 and FIG. 6, further includes a base substrate 4, where the touch structure 1, the tactile sensor 2 and the first electrode layer 3 are located on a same side of the base substrate 4.

In a specific implementation, the above-mentioned touch panel according to an embodiment of the disclosure, as shown in FIG. 3 and FIG. 6, further includes a first insulating layer 6 located between the first electrode layer 3 and the tactile sensor 2.

In a specific implementation, the above-mentioned touch panel according to an embodiment of the disclosure, as shown in FIG. 3 and FIG. 6, further includes a first connection layer 5 located between the first electrode layer 3 and the touch structure 1.

As shown in FIG. 3 and FIG. 6, the materials of the third electrode layer 21 and the fourth electrode layer 23 may include a transparent conductive material, and the material of the first electrode layer 3 also includes a transparent conductive material, so that the touch panel shown in FIG. 3 and FIG. 6 is a fully transparent device structure and can be used for integration with a display device. Certainly, the materials of the third electrode layer 21 and the fourth electrode layer 23 may also include a metal material, and the material of the first electrode layer 3 may include a transparent conductive material or a metal material. The materials of the third electrode layer 21, the fourth electrode layer 23 and the first electrode layer 3 are selected according to actual requirements. Both the first electrode layer 3 and the touch structure 1 shown in FIGS. 3 and 6 are attached to the side of the tactile sensor 2 away from the base substrate 4. The first electrode layer 3 is fabricated above the top electrode (the fourth electrode layer 23) of the tactile sensor 2, and the maximum thickness d of the first connection layer 5 may be in a range of 30 μm to 50 μm, for example, the maximum thickness d of the first connection layer 5 may be 30 μm, 35 μm, 40 μm, 45 μm, 50 μm, etc.

In a possible implementation, in the above-mentioned touch panel according to an embodiment of the disclosure, the material of the first connection layer may be Optical Clear Adhesive (OCA) or Optical Clear Resin (OCR), as a leveling adhesive layer.

In a specific implementation, in order to shield the electrostatic interference in the peripheral environment, the above-mentioned touch panel according to an embodiment of the disclosure, as shown in FIG. 3 and FIG. 6, further includes a second electrode layer 7 located on a side of the base substrate 4 away from the first electrode layer 3, where the second electrode layer 7 is grounded. The second electrode layer 7 can play an antistatic function to shield the electrostatic interference in the peripheral environment and improve the device performance of the tactile sensor 2.

Figure 7:
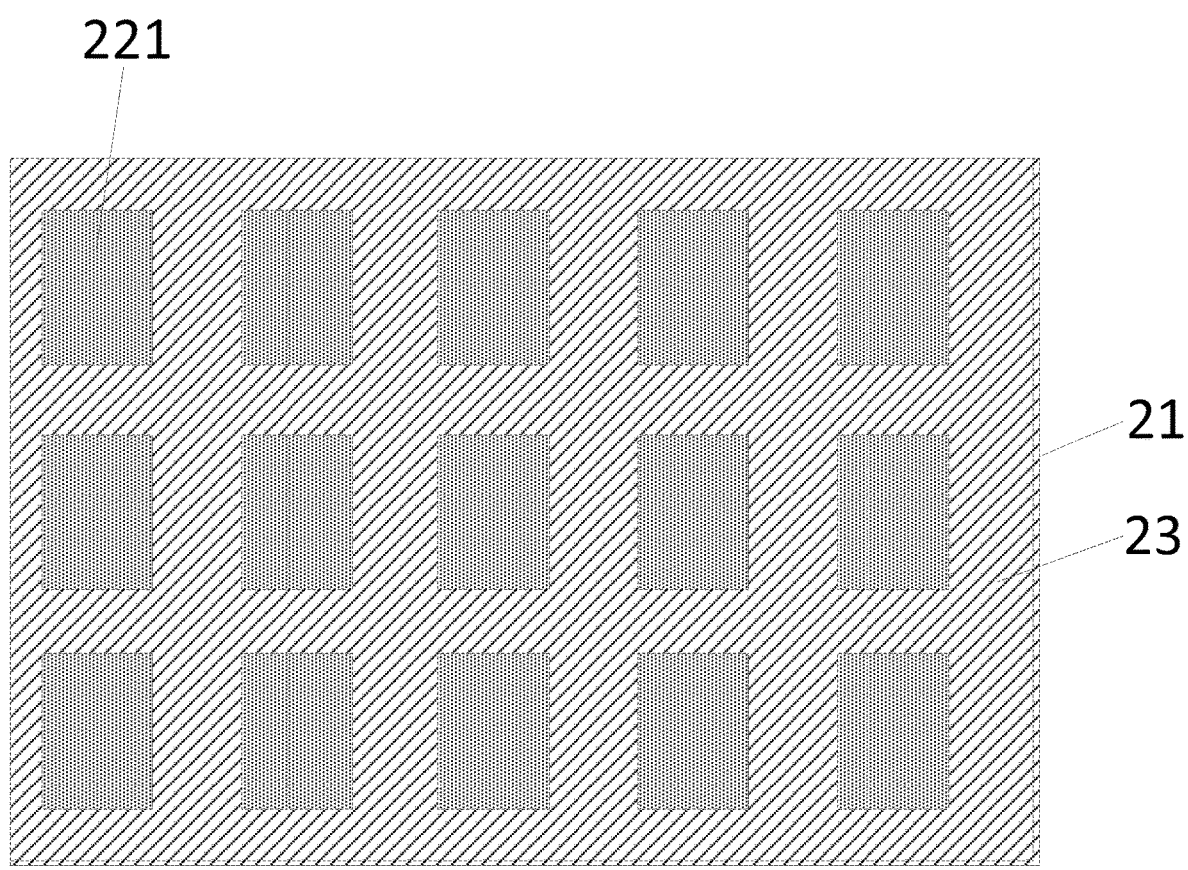
FIG. 7 is a schematic top view of some film layers in the tactile sensor.

In a specific implementation, in the above-mentioned touch panel according to an embodiment of the disclosure, as shown in FIGS. 1 to 6, the third electrode layer 21 is close to the base substrate 4. As shown in FIG. 7, the piezoelectric layer 22 includes a plurality of independently arranged piezoelectric parts 221, where each piezoelectric part 221 and the corresponding third electrode layer and fourth electrode layer constitute a piezoelectric sensing unit. FIG. 7 is a schematic top view of some film layers in the tactile sensor 2, and FIGS. 1-6 are schematic cross-sectional views corresponding to one of the piezoelectric parts 221 of the tactile sensor 2 shown in FIG. 7.

Figure 8:
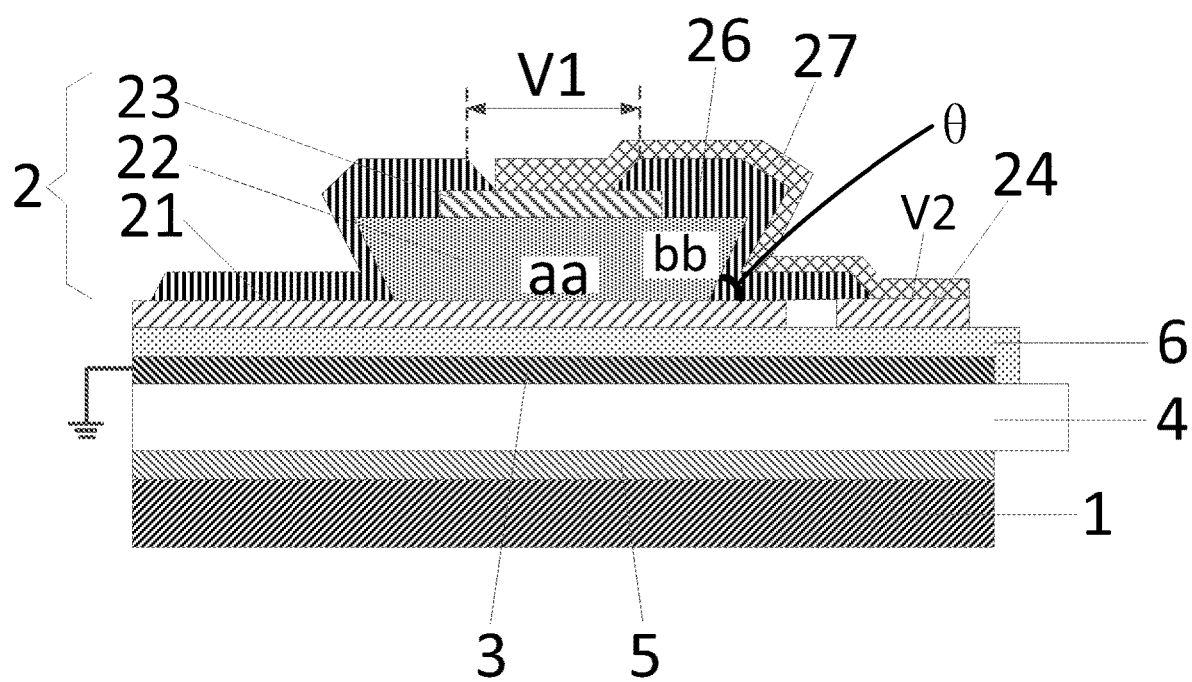
Figure 9:
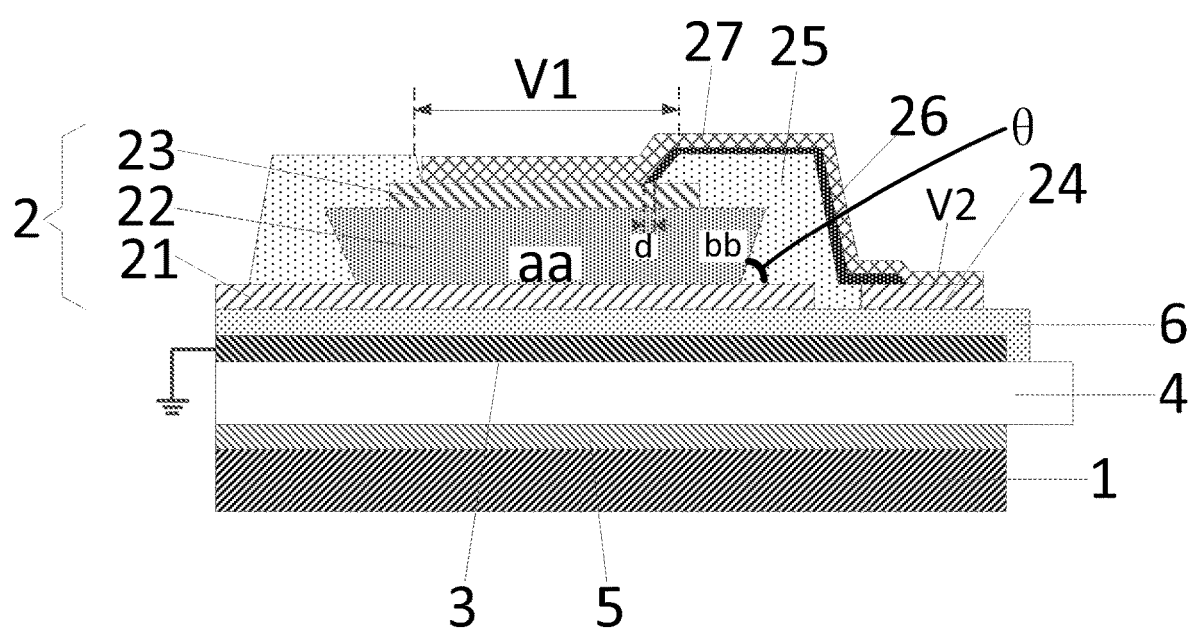
Figure 10:
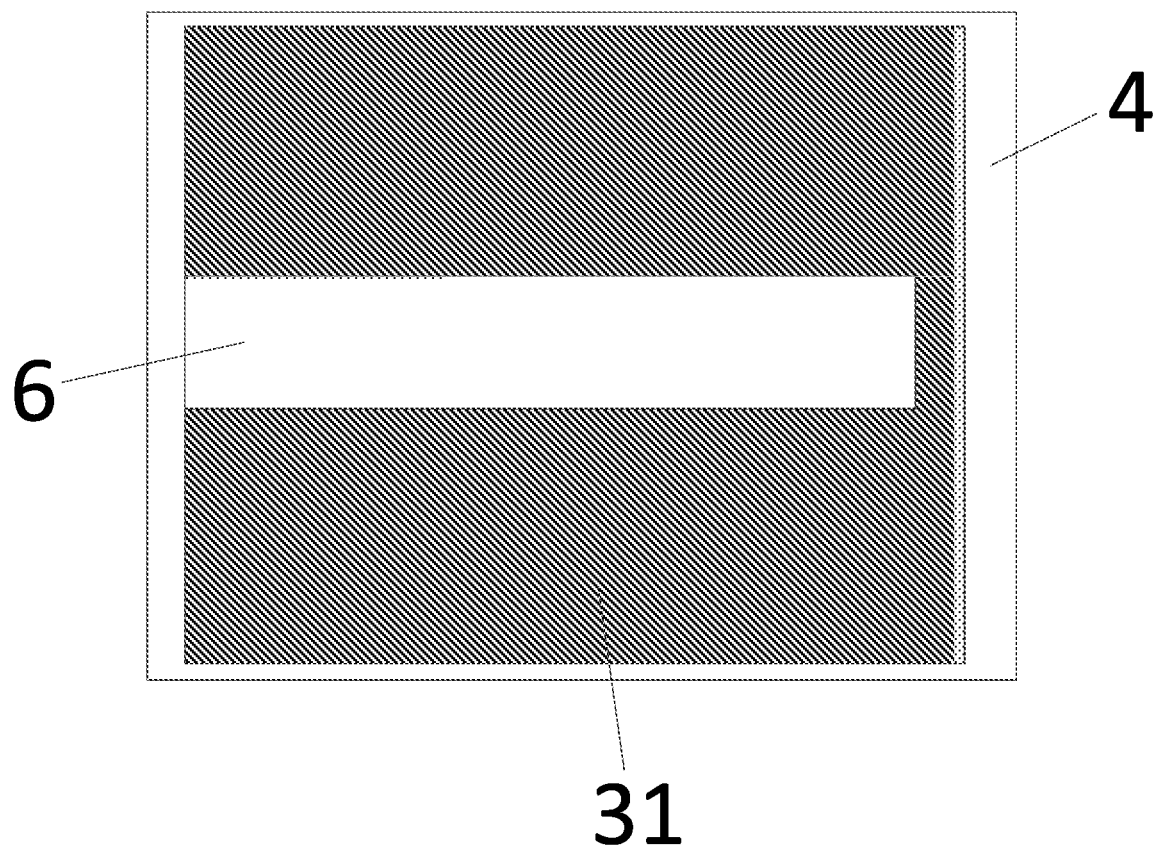
FIG. 10 is a schematic top view of the first electrode layer.

As shown in FIGS. 1-6, the first electrode layer 3 may be designed as a whole surface; or, as shown in FIG. 8 and FIG. 9, the position of the first electrode layer 3 in FIG. 8 is the same as the position of the first electrode layer 3 in FIG. 2, and the position of the first electrode layer 3 in FIG. 9 is the same as the position of the first electrode layer 3 in FIG. 5. The difference between FIG. 8 and FIG. 2 is that the first electrode layer 3 has different structures, and the difference between FIG. 9 and FIG. 5 is that the first electrode layer 3 has different structures. The first electrode layer 3 in FIG. 2 and FIG. 5 is designed as a whole surface, and the first electrode layer 3 in FIG. 8 and FIG. 9 includes a plurality of first electrodes 31 arranged in one-to-one correspondence with the piezoelectric parts 221 shown in FIG. 7. As shown in FIG. 10, FIG. 10 is a schematic top view of the first insulating layer 6 and the first electrode layer 3 in FIG. 8 and FIG. 9, and FIG. 10 only shows two first electrodes 31 in the first electrode layer 3 as an example. Each piezoelectric part 221 of the piezoelectric layer 22 in FIG. 8 and FIG. 9 corresponds to each first electrode 31 one by one, and all first electrodes 31 are electrically connected, that is, the first electrode layer 3 may be a grid structure. When the touch panel is used for integration with a display device, the transmittance can be improved.

It should be noted that, in FIG. 8 of an embodiment of the disclosure, the first electrode layer 3 is designed to include a plurality of first electrodes 31 arranged in one-to-one correspondence with the piezoelectric parts 221 shown in FIG. 7 on the basis of FIG. 2; and in FIG. 9 of an embodiment of the disclosure, the first electrode layer 3 is designed to include a plurality of first electrodes 31 arranged in one-to-one correspondence with the piezoelectric parts 221 shown in FIG. 7 on the basis of FIG. 5. Of course, in the structures shown in FIGS. 3, 4 and 6, the first electrode layer 3 may also be designed to include a plurality of first electrodes 31 arranged in one-to-one correspondence with the piezoelectric parts 221 shown in FIG. 7, which will not be described in detail here.

It should be noted that the third electrode layer 21 of the tactile sensor 2 may include a plurality of patterned third electrodes or may be a whole-surface structure; and the fourth electrode layer 23 includes a plurality of patterned fourth electrodes.

In a specific implementation, when the third electrode layer 21 includes a plurality of patterned third electrodes and the fourth electrode layer 23 includes a plurality of patterned fourth electrodes, the first electrode layer 3 may be designed as a whole surface or may include a plurality of patterned first electrodes 31, where the first electrodes 31, the third electrodes and the fourth electrodes are correspondingly arranged. When the third electrode layer 21 is a whole-surface structure and the fourth electrode layer 23 includes a plurality of patterned fourth electrodes, the first electrode layer 3 may be designed as a whole surface or may include a plurality of patterned first electrodes 31, where the first electrodes 31 and the fourth electrodes are correspondingly arranged.

In a specific implementation process, the material of the first electrode layer 3 may include a transparent conductive material, for example, the first electrode layer 3 may be made of Indium Tin Oxide (ITO), or may be made of Indium Zinc Oxide (IZO) or Indium Gallium Zinc Oxide (IGZO). Of course, the material of the first electrode layer 3 may also include a metal material, for example, the first electrode layer 3 may be made of one of titanium gold (Ti—Au) alloy, titanium aluminum titanium (Ti—Al—Ti) alloy and titanium-molybdenum (Ti—Mo) alloy, and moreover, may also be made of one of platinum (Pt), titanium (Ti), gold (Au), silver (Ag), molybdenum (Mo), copper (Cu), tungsten (W) and chromium (Cr). Those skilled in the art can set the above-mentioned first electrode layer according to actual application requirements, which is not limited here.

In a specific implementation process, the materials of the third electrode layer 21 and the fourth electrode layer 23 may include a transparent conductive material, for example, the third electrode layer 21 and the fourth electrode layer 23 may be made of at least one of Indium Tin Oxide (ITO), Indium Zinc Oxide (IZO) and Indium Gallium Zinc Oxide (IGZO). Of course, the materials of the third electrode layer 21 and the fourth electrode layer 23 may also include a metal material, for example, the third electrode layer 21 and the fourth electrode layer 23 may be made of one of titanium gold (Ti—Au) alloy, titanium aluminum titanium (Ti—Al—Ti) alloy and titanium-molybdenum (Ti—Mo) alloy, and moreover, may also be made of one of platinum (Pt), titanium (Ti), gold (Au), silver (Ag), molybdenum (Mo), copper (Cu), tungsten (W) and chromium (Cr). Those skilled in the art can set the above-mentioned third electrode layer and fourth electrode layer according to actual application requirements, which is not limited here.

In a specific implementation, in the above-mentioned touch panel according to an embodiment of the disclosure, when the materials of the first electrode layer, the third electrode layer and the fourth electrode layer include transparent conductive materials, the thicknesses thereof may be in a range of 200 nm to 500 nm, for example, the thickness of the first electrode layer may be 200 nm, 300 nm, 400 nm, 500 nm, etc., the thickness of the third electrode layer may be 200 nm, 300 nm, 400 nm, 500 nm, etc., and the thickness of the fourth electrode layer may be 200 nm, 300 nm, 400 nm, 500 nm, etc. When the materials of the first electrode layer, the third electrode layer and the fourth electrode layer include metal materials, the thicknesses thereof may be in a range of 100 nm to 300 nm, for example, the thickness of the first electrode layer may be 100 nm, 200 nm, 300 nm, etc., the thickness of the third electrode layer may be 100 nm, 200 nm, 300 nm, etc., and the thickness of the fourth electrode layer may be 100 nm, 200 nm, 300 nm, etc.

In a specific implementation, the material of the piezoelectric layer 22 may be at least one of lead zirconate titanate ($Pb(Zr,Ti)O_3$, PZT), aluminum nitride (AlN), ZnO (zinc oxide), barium titanate ($BaTiO_3$), lead titanate ($PbTiO_3$), potassium niobate ($KNbO_3$), lithium niobate ($LiNbO_3$), lithium tantalate ($LiTaO_3$), and gallium lanthanum silicate ($La_3Ga_5SiO_{14}$). The material for making the piezoelectric layer may be selected according to the actual use requirements of those skilled in the art, which is not limited here. Here, when PZT is used to make the piezoelectric layer, the PZT has a high piezoelectric coefficient, so the piezoelectric characteristic of the corresponding touch panel is guaranteed, and the corresponding touch panel can be applied to the tactile feedback device; and the PZT has a relatively high light transmittance, and does not affect the display quality of the display device when integrated into the display device.

In a specific implementation, in the above-mentioned touch panel according to an embodiment of the disclosure, as shown in FIGS. 1-6, 8 and 9, the fabrication processes of the piezoelectric layer 22 (e.g., PZT material) generally include dry etching and wet etching. The piezoelectric layer 22 includes a bottom edge aa in contact with the third electrode layer 21 and a side edge bb adjacent to the bottom edge aa. When the wet etching process is used, the piezoelectric layer 22 is very easy to form a chamfered structure (that is, an angle θ is formed between the side edge bb and the third electrode layer 21), and θ is generally 60° to 85°; when the piezoelectric layer 22 is fabricated by the dry etching process, the angle θ between the side edge bb and the third electrode layers 21 is generally in a range of 85° to 95°.

It should be noted that an embodiment of the disclosure takes the use of the wet etching process to fabricate the piezoelectric layer 22 as an example, that is, the angle θ between the side edge bb and the third electrode layer 21 is generally in a range of 60° to 85°.

Figure 11:
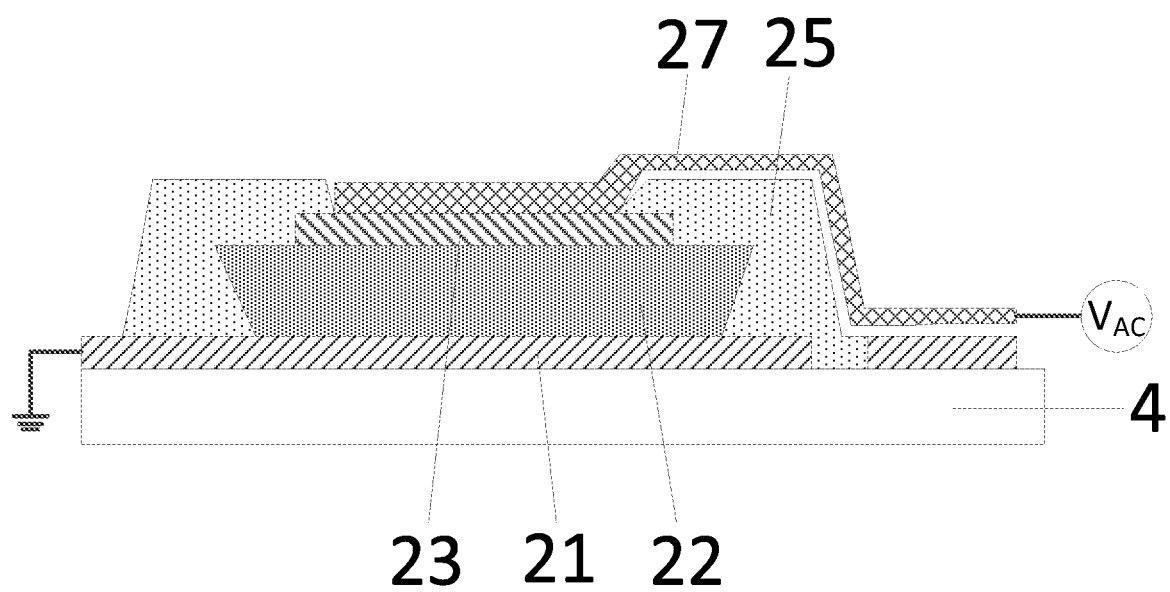
FIG. 11 is a schematic structural diagram of a tactile sensor provided in the related art.

In a specific implementation, in the above-mentioned touch panel according to an embodiment of the disclosure, as shown in FIGS. 4-6 and 9, the tactile sensor 2 includes: an organic insulating layer 25 located on a side of the fourth electrode layer 23 away from the piezoelectric layer 22, an inorganic insulating layer 26 located on a side of the organic insulating layer 25 away from the piezoelectric layer 22, and a wiring layer 27 located on a side of the inorganic insulating layer 26 away from the piezoelectric layer 22. In the process of fabricating the piezoelectric layer 22 (e.g. PZT material), especially when the wet etching is used to fabricate the thick film PZT, the piezoelectric layer 22 is very easy to form a chamfered structure (θ). As shown in FIGS. 1-3 and 8, the inorganic insulating layer 26 used between the wiring layer 27 and the fourth electrode layer 23 cannot fill the chamfered structure (θ) of the piezoelectric layer 22, which will easily lead to the risk of disconnection of the wiring layer 27. Thus, as shown in FIGS. 4-6 and 9, the organic insulating layer 25 is used between the wiring layer 27 and the fourth electrode layer 23 to fill the chamfer (θ) of the piezoelectric layer 22. However, due to poor adhesion between the organic insulating layer 25 and the wiring layer 27, the wiring layer 27 is easy to fall off (as shown in FIG. 11). Thus, in an embodiment of the disclosure, the inorganic insulating layer 26 is arranged between the wiring layer 27 and the organic insulating layer 25 in FIGS. 4-6 and 9. Due to the strong adhesion between the inorganic insulating layer 26 and the wiring layer 27, the inorganic insulating layer 26 can solve the problem of poor adhesion between the organic insulating layer 25 and the wiring layer 27 on the basis of the organic insulating layer 25 solving the chamfer problem of the piezoelectric layer 22 of the tactile sensor 2, thereby preventing the wiring layer 27 from falling off.

In a specific implementation, in the above-mentioned piezoelectric sensor according to an embodiment of the disclosure, as shown in FIGS. 4-6 and 9, the inorganic insulating layer 26 covers a sidewall of the first via hole V1 and extends to contact with the fourth electrode layer 23. Due to the influence of the fabrication process, the cross-section of the first via hole V1 along the thickness direction of the tactile sensor 2 is generally an inverted trapezoidal structure, and the inorganic insulating layer 26 is arranged to cover the side wall of the first via hole V1 and extend to contact with the fourth electrode layer 23. In this way, the inorganic insulating layer 26 has a buffering effect in the first via hole V1, so that the wiring layer 27 fabricated subsequently will not be disconnected at the first via hole V1.

In a specific implementation, in the above-mentioned piezoelectric sensor according to an embodiment of the disclosure, as shown in FIGS. 4-6 and 9, at the first via hole V1, a contact boundary between the inorganic insulating layer 26 and the fourth electrode layer 23 is a first boundary, a contact boundary between the organic insulating layer 25 and the fourth electrode layer 23 is a second boundary, and a distance d between the first boundary and the second boundary may be greater than 30% of the thickness of the piezoelectric layer 22 and less than 60% of the thickness of the piezoelectric layer 22. The thickness of the piezoelectric layer 22 is generally in a range of 2 μm to 5 μm, for example, the thickness of the piezoelectric layer is 2 μm, 3 μm, 4 μm, 5 μm. For example, taking the piezoelectric layer 22 with a thickness of 2 μm as an example, d is greater than 0.6 μm and less than 1.2 m; taking the piezoelectric layer 22 with a thickness of 4 μm as an example, d is greater than 1.2 μm and less than 2.4 m; and so on.

Figure 12:
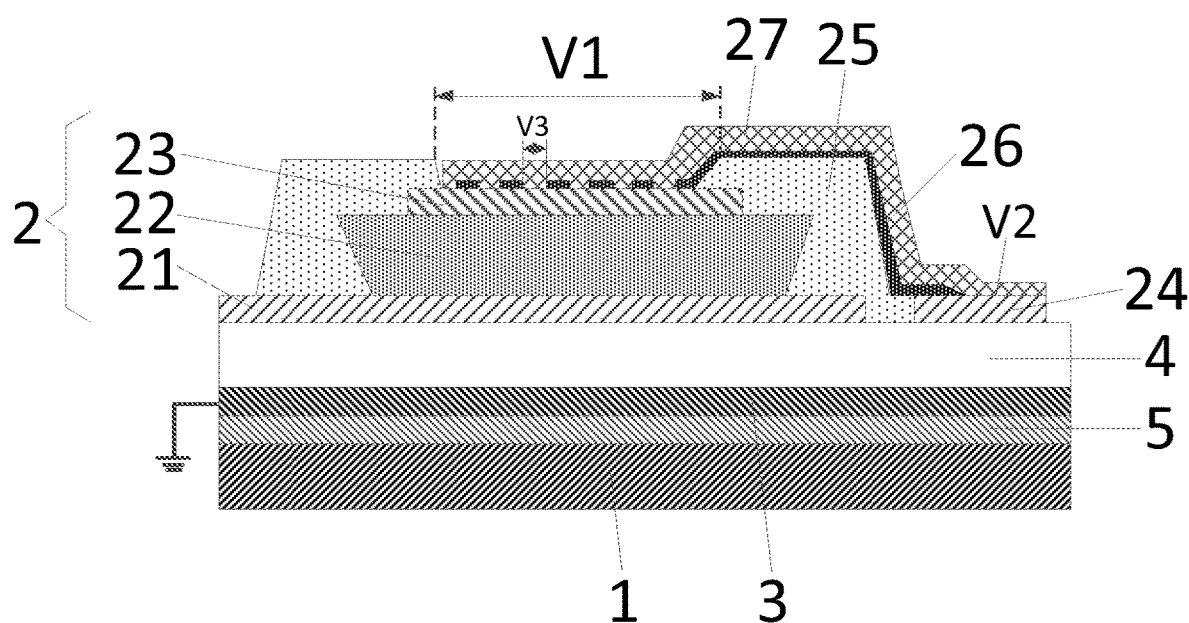

In a specific implementation, the material of the wiring layer is generally a metal material, the material of the fourth electrode layer is generally indium tin oxide (ITO), and the adhesion between the metal and ITO is not good. In order to prevent the problem that electrical signal transmission cannot be performed due to peeling between the wiring layer and the four electrode layer, in the above-mentioned piezoelectric sensor according to an embodiment of the disclosure, as shown in FIG. 12, the inorganic insulating layer 26 covers a sidewall of the first via hole V1 and covers the fourth electrode layer 23 exposed by the first via hole V1, a part of the fourth electrode layer 23 covered by the inorganic insulating layer 26 has at least one third via hole V3, and the wiring layer 27 is electrically connected to the fourth electrode layer 23 through the first via hole V1 and the third via hole V3. In this way, the wiring layer 27 and the exposed fourth electrode layer 23 are partially in contact with the inorganic insulating layer 26, and partially electrically connected to the fourth electrode layer 23 through the first via hole V1 and the third via hole V3. The adhesion between the wiring layer 27 and the inorganic insulating layer 26 is strong, so the adhesion between the wiring layer 27 and the fourth electrode layer 23 can be improved on the basis of ensuring the electrical connection between the wiring layer 27 and the fourth electrode layer 23.

Figure 13:
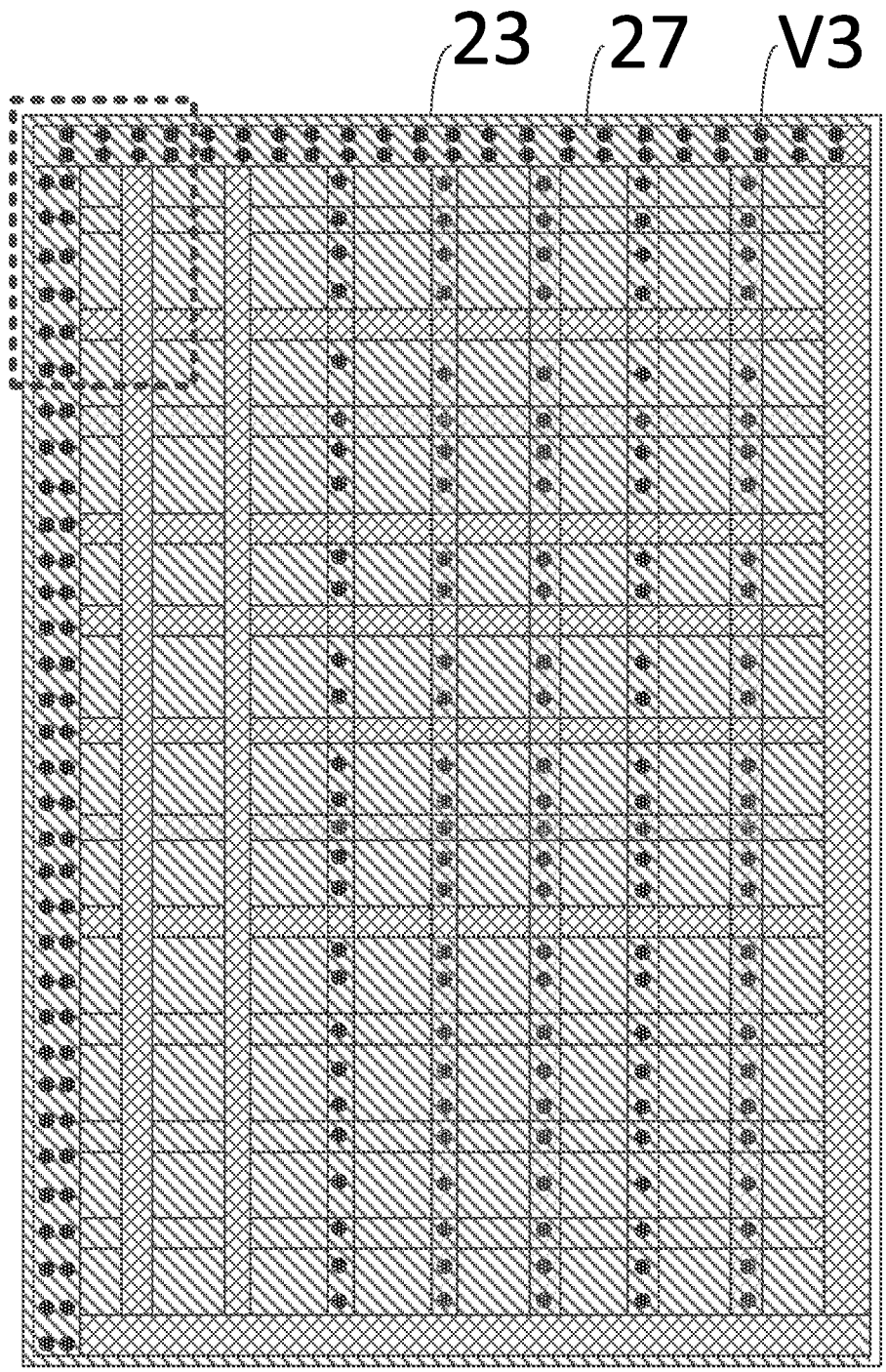
FIG. 13 is a schematic top view of some film layers in the tactile sensor.
Figure 14:
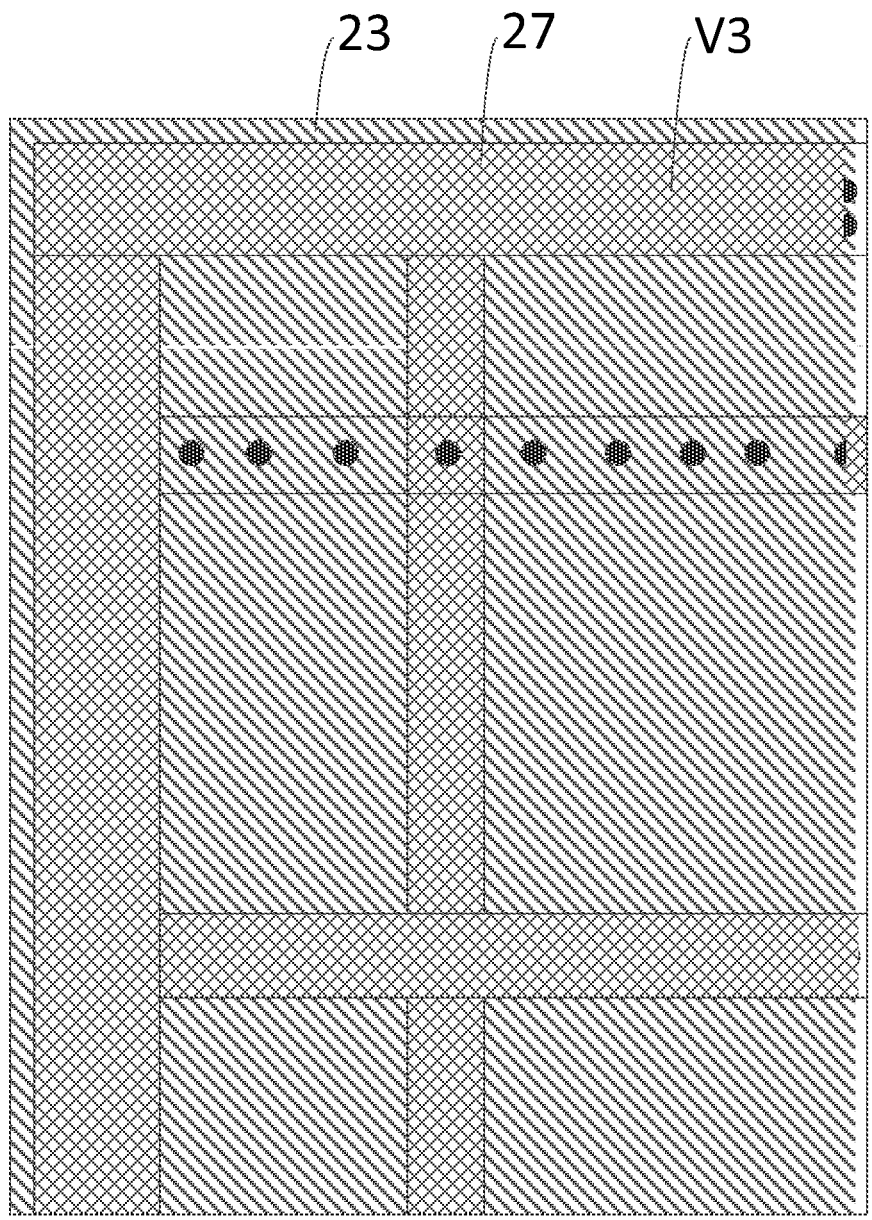
FIG. 14 is a partially enlarged schematic diagram of FIG. 13.

In a specific implementation, in order to show the electrical connection between the wiring layer 27 and the fourth electrode layer 23 through the third via hole V3 in FIG. 12 more clearly, as shown in FIG. 13 and FIG. 14, FIG. 13 is a schematic top view of the fourth electrode layer 23, the third via hole V3 and the wiring layer 27, and FIG. 14 is an enlarged schematic diagram of the dotted line box in FIG. 13. The tactile sensor is generally combined with the display device to achieve tactile reproduction. In order to improve the transmittance of the tactile sensor, the shape of the wiring layer 27 may be a grid-like structure, and each grid line of the grid-like structure may be provided with a plurality of third via holes V3 corresponding to the inorganic insulating layer 26 below, to realize the electrical connection between the wiring layer 27 and the fourth electrode layer 23 through the third via hole V3.

In a specific implementation, in the above-mentioned touch panel according to an embodiment of the disclosure, as shown in FIGS. 4-6, 9 and 12, the number of inorganic insulating layer 26 may be 1. The material of the inorganic insulating layer 26 may include but not limited to at least one of $SiO_2$, $Al_2O_3$ or $Si_3N_4$.

Figure 15:
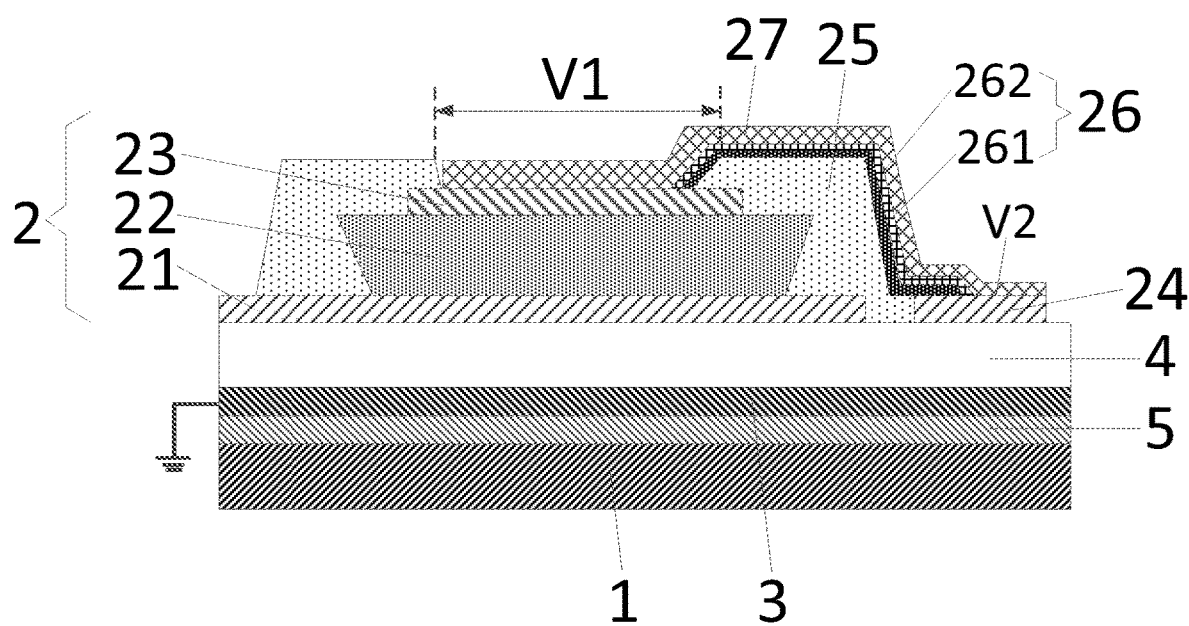
Figure 16:
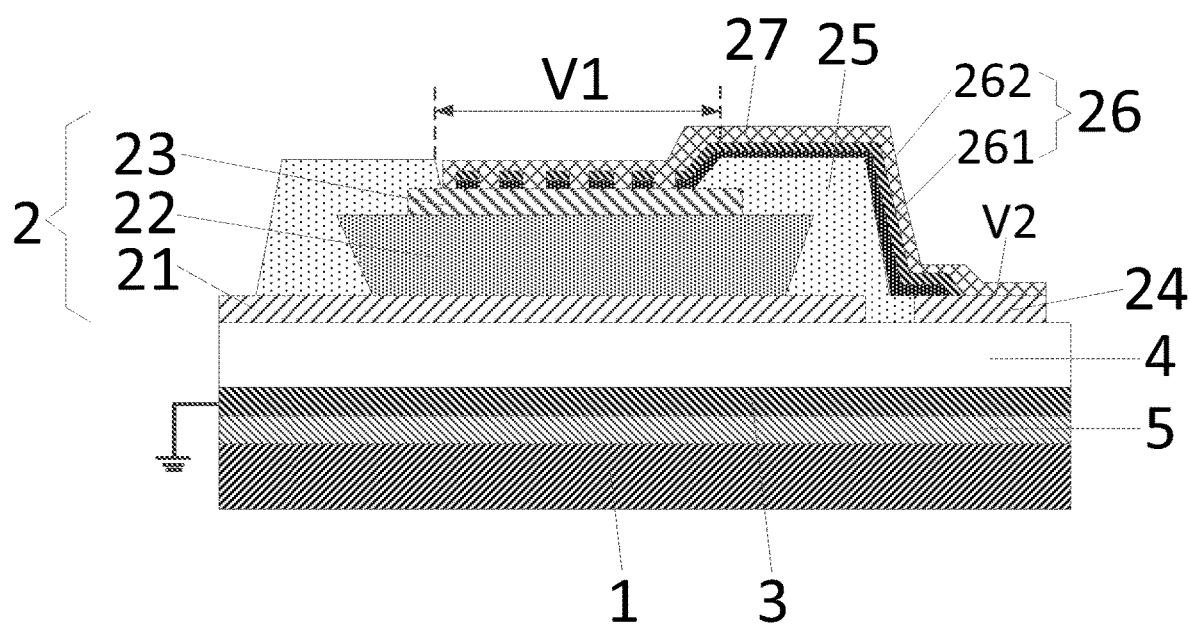

In a specific implementation, in the above-mentioned touch panel according to an embodiment of the disclosure, as shown in FIG. 15 and FIG. 16, the inorganic insulating layer 26 may include at least two sub-insulating layers (261 and 262) stacked, and materials of the two sub-insulating layers (261 and 262) are different. The material of each of the sub-insulating layers (261 and 262) may include but not limited to at least one of $SiO_2$, $Al_2O_3$ or $Si_3N_4$.

It should be noted that, in FIG. 15 and FIG. 16, the inorganic insulating layer 26 is configured to include at least two sub-insulating layers (261 and 262) stacked on the basis of FIG. 4. Of course, the inorganic insulating layer 26 in the structures shown in FIG. 5, FIG. 6 and FIG. 9 may also be configured to include at least two sub-insulating layers (261 and 262) stacked, which will not be described in detail here.

In a specific implementation process, the base substrate in embodiments of the disclosure may be a substrate made of glass, or a substrate made of silicon or silicon dioxide ($SiO_2$), or a substrate made of sapphire, or a substrate made of a metal wafer, which is not limited here. Those skilled in the art can set the base substrate according to actual application requirements.

In a specific implementation, in the above-mentioned touch panel according to an embodiment of the disclosure, the material of the wiring layer may be Ti/Ni/Au, where Ti may be 10 nm, Ni may be 400 nm, and Au may be 100 nm; or the material of the wiring layer may be Ti/Au, where Ti may be 10 nm, and Au may be 400 nm; or the material of the wiring layer may be Ti/Al/Ti, where Ti may be 10 nm, and Al may be 300 nm.

In a specific implementation, in the above-mentioned touch panel according to an embodiment of the disclosure, as shown in FIGS. 4-6 and 9, the thickness of the inorganic insulating layer 26 may be in a range of 100 nm to 300 nm, for example, the thickness of the inorganic insulating layer 26 is 100 nm, 200 nm or 300 nm.

As shown in FIGS. 1-6, 8, 9, 12, 15 and 16, in order to reduce the risk of short circuit, the edge of the fourth electrode layer 23 may be indented relative to the edge of the piezoelectric layer 22. In a specific implementation, the indentation of the edge of the fourth electrode layer 23 relative to the edge of the piezoelectric layer 22 is greater than or equal to 100 microns and less than or equal to 500 microns. For example, the indentation may be 150 microns.

In order to further reduce the risk of short circuit, the edge of the piezoelectric layer 22 may be indented relative to the edge of the third electrode layer 21.

In a specific implementation, the above-mentioned touch panel according to an embodiment of the disclosure may also include other film layers well known to those skilled in the art, which will not be described in detail here.

The touch panel according to an embodiment of the disclosure may be applied to fields such as medical treatment, automotive electronics and motion tracking system, and is especially applicable to the field of wearable devices, monitoring and treatment outside the body or implanted in the human body, or electronic skin applied to artificial intelligence or other fields. The touch panel may be applied to brake pad, keyboard, mobile terminal, game handle, vehicle-carried device, and other devices that can generate vibration and mechanical characteristics.

Based on the same inventive concept, an embodiment of the disclosure further provides a touch device, including the above-mentioned touch panel according to embodiments of the disclosure. Since the principle of the touch device to solve the problem is similar to that of the aforementioned touch panel, implementations of the touch device can refer to implementations of the aforementioned touch panel, and the repeated description thereof will be omitted here. The touch device may be: a mobile phone, a tablet, a television, a display, a laptop, a digital photo frame, a navigator, or any other product or component with display or touch function.

Figure 17:
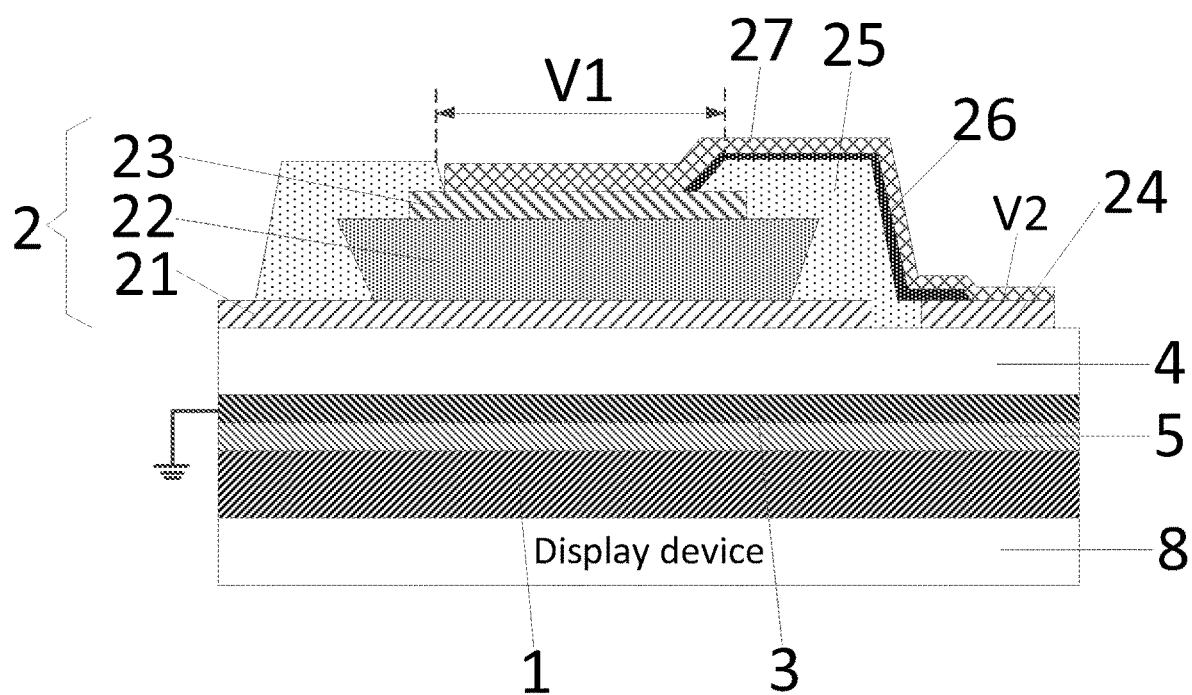
FIG. 17 is a schematic structural diagram of a touch device according to an embodiment of the disclosure.
Figure 18:
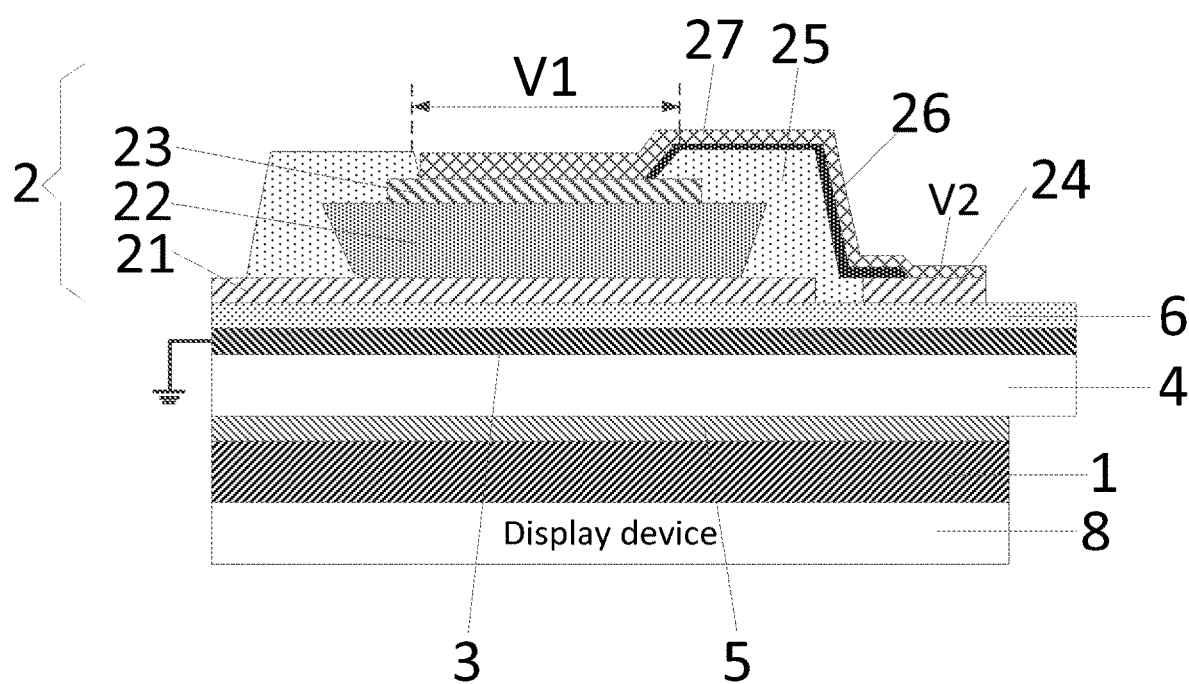
FIG. 18 is a schematic structural diagram of another touch device according to an embodiment of the disclosure.

In a specific implementation, in the above-mentioned touch device according to an embodiment of the disclosure, as shown in FIG. 17 and FIG. 18, when the materials of the third electrode layer 21, the fourth electrode layer 23 and the first electrode layer 3 include a transparent conductive material, the touch device further includes a display device 8, the touch panel is located on a light emitting side of the display device 8, and a surface of the touch panel far away from the display device 8 is a touch surface. That is to say, the fully transparent touch panel is used for integration with the display device.

It should be noted that the touch device shown in FIG. 17 in an embodiment of the disclosure is obtained by integrating the touch panel shown in FIG. 4 with the display device, and the touch device shown in FIG. 18 is obtained by integrating the touch panel shown in FIG. 5 with the display device. Of course, the touch panels shown in FIGS. 1-3, 6, 8 and 9 may also be used to integrate with the display device, which will not be described in detail here.

In a specific implementation, the above display device may be a Liquid Crystal Display (LCD) or an Organic Light Emitting Diode (OLED), and of course, may also be other display devices, which are not limited here.

In a specific implementation, the above-mentioned touch device according to an embodiment of the disclosure may also include other film layers well known to those skilled in the art, which will not be described in detail here.

In a specific implementation, the touch position of the human body can be determined through the touch device, to generate the corresponding vibration waveform, amplitude and frequency, and realize the human-computer interaction. Of course, the touch device may also be applied to fields such as medical treatment, automotive electronics and motion tracking system according to actual requirements, which will not be described in detail here.

Embodiments of the disclosure provide a touch panel and a touch device. This touch panel adopts a structure integrating the tactile sensor and the touch structure, and can realize the touch function and the tactile reproduction function. Also, the grounded first electrode layer is provided between the touch structure and the tactile sensor, and the first electrode layer acts as a shield to ensure that no coupling capacitance is formed between the touch structure and the tactile sensor, thereby ensuring that the touch structure will not be affected by the drive signal of the tactile sensor, and thus improving the touch effect of the touch structure.

Although embodiments of the disclosure have been described, those skilled in the art can make additional alterations and modifications to these embodiments once they learn about the basic creative concepts. Thus, the attached claims are intended to be interpreted to include embodiments as well as all the alterations and modifications falling within the scope of the disclosure.

Evidently, those skilled in the art can make various modifications and variations to embodiments of the disclosure without departing from the spirit and scope of embodiments of the disclosure. Thus, the disclosure is also intended to encompass these modifications and variations to embodiments of the disclosure as long as these modifications and variations come into the scope of the claims of the disclosure and their equivalents.

What is claimed is:

1. A touch panel, comprising:
   a touch structure;
   a tactile sensor stacked with the touch structure and configured to generate a standing wave on a surface of the touch panel during operation to realize tactile reproduction;
   a first electrode layer located between the touch structure and the tactile sensor, wherein the first electrode layer is insulated from the tactile sensor and the touch structure, and the first electrode layer is grounded;
   wherein the tactile sensor comprises a third electrode layer, a piezoelectric layer and a fourth electrode layer stacked, the third electrode layer is close to a base substrate, and the piezoelectric layer comprises a plurality of independently arranged piezoelectric parts.

2. The touch panel according to claim 1, wherein the base substrate is located between the touch structure and the tactile sensor.

3. The touch panel according to claim 2, wherein the base substrate is located between the tactile sensor and the first electrode layer.

4. The touch panel according to claim 3, further comprising a first connection layer located between the first electrode layer and the touch structure.

5. The touch panel according to claim 4, wherein a material of the first connection layer comprises optical clear adhesive or optical clear resin;
   wherein a maximum thickness of the first connection layer is in a range of 30 μm to 50 μm.

6. The touch panel according to claim 2, wherein the base substrate is located between the first electrode layer and the touch structure;
the touch panel further comprising a first insulating layer located between the tactile sensor and the first electrode layer;
the touch panel further comprising a first connection layer located between the base substrate and the touch structure.

7. The touch panel according to claim 1, further comprising a base substrate, wherein the touch structure, the tactile sensor and the first electrode layer are located on a same side of the base substrate;
the touch panel further comprising a first insulating layer located between the first electrode layer and the tactile sensor;
the touch panel further comprising a first connection layer located between the first electrode layer and the touch structure;
the touch panel further comprising a second electrode layer located on a side of the base substrate away from the first electrode layer, wherein the second electrode layer is grounded.

8. The touch panel according to claim 1, wherein the first electrode layer is designed as a whole surface.

9. The touch panel according to claim 8, wherein a thickness of the piezoelectric layer is in a range of 2 μm to 5 μm.

10. The touch panel according to claim 8, wherein the tactile sensor further comprises: an inorganic insulating layer located on a side of the fourth electrode layer away from the piezoelectric layer, and a wiring layer located on a side of the inorganic insulating layer away from the piezoelectric layer; wherein:
the inorganic insulating layer has a first via hole arranged corresponding to the fourth electrode layer, and the wiring layer is electrically connected to the fourth electrode layer through the first via hole.

11. The touch panel according to claim 10, wherein a shape of the wiring layer is a grid structure, and a material of the wiring layer is Ti/Ni/Au, Ti/Au or Ti/Al/Ti;
wherein a thickness of the inorganic insulating layer is in a range of 100 nm to 300 nm.

12. The touch panel according to claim 8, wherein the tactile sensor further comprises: an organic insulating layer located on a side of the fourth electrode layer away from the piezoelectric layer, an inorganic insulating layer located on a side of the organic insulating layer away from the piezoelectric layer, and a wiring layer located on a side of the inorganic insulating layer away from the piezoelectric layer; wherein:
the organic insulating layer has a first via hole arranged corresponding to the fourth electrode layer, the inorganic insulating layer does not overlap at least partially with the first via hole, and one end of the wiring layer is electrically connected to the fourth electrode layer through at least a part of the first via hole.

13. The touch panel according to claim 12, wherein the inorganic insulating layer covers a sidewall of the first via hole and extends to contact with the fourth electrode layer;
wherein, at the first via hole, a contact boundary between the inorganic insulating layer and the fourth electrode layer is a first boundary, a contact boundary between the organic insulating layer and the fourth electrode layer is a second boundary, and a distance between the first boundary and the second boundary is greater than 30% of a thickness of the piezoelectric layer and less than 60% of the thickness of the piezoelectric layer.

14. The touch panel according to claim 12, wherein the inorganic insulating layer covers a sidewall of the first via hole and covers the fourth electrode layer exposed by the first via hole, a part of the fourth electrode layer covered by the inorganic insulating layer has at least one second via hole, and the wiring layer is electrically connected to the fourth electrode layer through the first via hole and the second via hole.

15. The touch panel according to claim 12, wherein a number of the inorganic insulating layer is 1;
wherein a material of the inorganic insulating layer comprises at least one of $SiO_2$, $Al_2O_3$ or $Si_3N_4$.

16. The touch panel according to claim 12, wherein the inorganic insulating layer comprises at least two sub-insulating layers stacked, and materials of the two sub-insulating layers are different;
wherein a material of each of the sub-insulating layers comprises at least one of $SiO_2$, $Al_2O_3$ or $Si_3N_4$.

17. The touch panel according to claim 8, wherein a material of the piezoelectric layer comprises at least one of lead zirconate titanate, aluminum nitride, zinc oxide, barium titanate, lead titanate, potassium niobate, lithium niobate, lithium tantalate, and gallium lanthanum silicate.

18. The touch panel according to claim 1, wherein the first electrode layer comprises a plurality of first electrodes arranged in one-to-one correspondence with the piezoelectric parts, and all of the first electrodes are electrically connected.

19. The touch panel according to claim 1, wherein a material of the first electrode layer comprises a transparent conductive material or a metal material;
wherein the transparent conductive material comprises at least one of indium tin oxide, indium zinc oxide or indium gallium zinc oxide;
wherein the metal material comprises at least one of platinum, copper or gold;
wherein when the material of the first electrode layer comprises the transparent conductive material, a film thickness of the transparent conductive material is in a range of 200 nm to 500 nm;
when the material of the first electrode layer comprises the metal material, a film thickness of the metal material is in a range of 100 nm to 300 nm.

20. A touch device, comprising a touch panel, the touch panel comprising:
a touch structure;
a tactile sensor stacked with the touch structure and configured to generate a standing wave on a surface of the touch panel during operation to realize tactile reproduction;
a first electrode layer located between the touch structure and the tactile sensor, wherein the first electrode layer is insulated from the tactile sensor and the touch structure, and the first electrode layer is grounded;
wherein the tactile sensor comprises a third electrode layer, a piezoelectric layer and a fourth electrode layer stacked, the third electrode layer is close to a base substrate, and the piezoelectric layer comprises a plurality of independently arranged piezoelectric parts.

* * * * *